Patented June 22, 1954

2,681,900

UNITED STATES PATENT OFFICE 2,681,900

STABILIZED HALOGEN-CONTAINING VINYLIDENE RESINS

Roland A. Holmes, Longmeadow, Mass., John F. Murphy, Somers, Conn., and Robert L. Werkheiser, Springfield, Mass., assignors to Monsanto Chemical Company, St. Louis, Mo., a corporation of Delaware No Drawing. Application August 13, 1952, Serial No. 304,214

6 Claims. (Cl. 260—45.75)

This invention relates to the stabilization of vinylidene resins. More particularly, this invention relates to the prevention of deterioration of halogen-containing vinylidene resins.

The stabilization of halogen-containing vinylidene resins has presented a serious problem, particularly when it is desired to manufacture light colored, transparent articles that do not discolor on heating. Many types of stabilizing materials have been suggested for preventing deterioration of such polymeric products but while some have effected substantial improvement there has still been much to be desired in the results obtained. Particular difficulty has been encountered with respect to the elimination of haze in finally prepared products. This problem is accentuated in the case of thin films formed from such polymeric materials and the use of conventional stabilizers has generally proved unsatisfactory in this connection.

Accordingly, an object of the present invention is the provision of halogen-containing vinylidene resin compositions having improved resistance to deterioration.

Another object is the provision of halogen-containing vinylidene resin compositions having increased resistance to discoloration at elevated temperatures.

A further object is the provision of heat stable halogen-containing vinyidene compositions that may be formed into thin films without the formation of haze.

These and other objects are attained by incorporating a minor amount of cadmium monocyclohexyl maleate into a halogen-containing vinylidene resin.

The following examples are given in illustration of this invention and are not to be construed as limitations thereon. Where parts are mentioned, they are parts by weight.

Example I

Cadmium monocyclohexyl maleate is conveniently prepared by reacting maleic anhydride with cyclohexanol and by reacting the product with cadmium acetate. In accordance with this procedure, maleic anhydride was heated to a temperature of 120° C. and cyclohexanol was added dropwise, 0.5 mol of cyclohexanol per mol of maleic anhydride being used. Monocyclohexyl maleate (melting point 58.5–59.5° C.) was formed and recovered by crystallization from a hydrocarbon solvent. The thus recovered product was slurried in boiling water and an aqueous solution of cadmium acetate was slowly added with agitation, 0.5 mol of cadmium acetate per mol of monocyclohexyl maleate being used. Cadmium monocyclohexyl maleate quickly formed and precipitated from the solution. It was recovered by filtration and carefully washed in order to remove residual acetic acid. The thus recovered cadmium monocyclohexyl maleate was a clear, colorless crystalline solid having a melting point of 97–100° C.

Example II

A mixture of 100 parts of poylvinyl chloride, 50 parts of dioctyl phthalate plasticizer and 3 parts of cadmium monocyclohexyl maleate was homogeneously blended on a Baker-Perkins mixer and molded into disks at a temperature of about 150° C. and a pressure of about 400 p. s. i. on a compression molding machine. The cadmium monocyclohexyl maleate proved to be readily dispersible in and compatible with the polyvinyl chloride. The disks were clear and colorless and remained free from haze even when heated for 10 minutes at a temperature of 150° C. After 15 minutes of heating the disks were still substantially clear, only a very faint haze being visible.

Films having a thickness of 0.012" (12 gauge) prepared from this mixture and heated to a temperature of 150° C. for 10 minutes were free from haze whereas films prepared from a similar mixture wherein triethyl lead monohexyl maleate was used in place of the cadmium monocyclohexyl maleate were hazy.

Example III

A mixture of 100 parts of a vinyl chloride-vinyl acetate copolymer (containing approximately 88% vinyl chloride), 2 parts of cadmium monocyclohexyl maleate and 0.25 part of stearic acid lubricant was prepared and molded into disks using the procedure of Example II. The disks were free from haze, transparent and colorless, and remained so even after being heated for 10 minutes at a temperature of 150° C. After 15 minutes of heating at this temperature a very slight haze was evident. Films having a thickness of 0.012" prepared from this formulation were free from haze.

It is apparent from the foregoing results that surprising and improved performance is obtained through the use of cadmium monocyclohexyl maleate as a stabilizer for halogen-containing vinylidene resins. Of particular significance is the fact that films may be formed from such compositions without the formation of haze. Other advantages are also obtained through the use of cadmium monocyclohexyl maleate as a stabilizer. Thus, in contrast to stabilizers prepared from long chain fatty acids, the stabilizer of the present invention does not exert an undesirable lubricating or plasticizing action on the vinylidene resin.

In place of the resins used in the examples, similar improvements may be effected by incorporating the stabilizer of the invention into other halogen-containing vinylidene resins, numerous examples of which are well-known to those skilled in the art. Examples of vinylidene or substituted vinylidene compounds from which such resins may be made include vinyl chloride, vinylidene chloride, vinyl chloracetate, etc. Such vinylidene or substituted vinylidene compounds may be polymerized singly or in admixture with these or other vinylidene or substituted vinylidene compounds free from halogen such as vinyl acetate, methyl acrylate, methyl methacrylate, styrene, etc.

While the stabilizer of the present invention is preferably incorporated into the resin subsequent to polymerization, it may be incorporated into the monomeric materials prior to polymerization if desired.

The proportion of cadmium monocyclohexyl maleate incorporated into a halogen-containing vinylidene resin may be varied depending on the nature of the resin and the conditions under which it is to be used. Usually, at least 0.1 part of stabilizer per 100 parts of resin is necessary to prevent coloration under even moderate conditions of heating and, preferably, from 0.5 to 4 parts of stabilizer per 100 parts of resin are used. Although larger amounts of stabilizer may be used if desired, no substantial improvement in performance will be achieved and, accordingly, for reasons of economy it is preferable that not more than about 4 parts of stabilizer per 100 parts of resin be used.

The stabilizer of the invention is also effective in vinylidene resins containing halogens other than chlorine, e. g., bromine or fluorine.

The compositions of the present invention may be modified by the addition of conventional ingredients such as plasticizers, pigments, dyes, fillers, lubricants, etc.

It is obvious that many variations may be made in the products of the invention without departing from the spirit and scope thereof as defined by the appended claims.

What is claimed is:

1. A composition of matter resistant to the discoloring effects of heat comprising a polymeric halogen-containing vinylidene resin and a stabilizing amount of cadmium monocyclohexyl maleate.

2. A composition of matter as in claim 1 wherein halogen-containing vinylidene resin is polyvinyl chloride.

3. A composition of matter as in claim 1 wherein the halogen-containing vinylidene resin is a copolymer of vinyl chloride and vinyl acetate.

4. A composition of matter resistant to the discoloring effects of heat comprising 100 parts of a vinyl chloride polymer and from 0.5 to 4 parts of cadmium monocyclohexyl maleate.

5. A composition of matter as in claim 4 wherein the polymer is a homopolymer of vinyl chloride.

6. A composition of matter as in claim 4 wherein the polymer is a copolymer of vinyl chloride and vinyl acetate.

References Cited in the file of this patent

UNITED STATES PATENTS

| Number | Name | Date |
| --- | --- | --- |
| 2,598,496 | Bradley et al. | May 27, 1952 |